United States Patent
Kumagai

(10) Patent No.: US 9,270,135 B2
(45) Date of Patent: Feb. 23, 2016

(54) POWER SUPPLY APPARATUS AND POWER SUPPLY SWITCHING METHOD

(71) Applicant: Sony Corporation, Tokyo (JP)

(72) Inventor: Eiji Kumagai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 444 days.

(21) Appl. No.: 13/898,526

(22) Filed: May 21, 2013

(65) Prior Publication Data

US 2013/0320927 A1 Dec. 5, 2013

(30) Foreign Application Priority Data

Jun. 1, 2012 (JP) .................... 2012-125661

(51) Int. Cl.
*H02J 7/00* (2006.01)
*H02J 1/10* (2006.01)
*H02J 9/00* (2006.01)
*H02J 9/06* (2006.01)

(52) U.S. Cl.
CPC ............... *H02J 7/007* (2013.01); *H02J 7/0013* (2013.01); *H02J 9/06* (2013.01); *Y02T 10/7055* (2013.01)

(58) Field of Classification Search
CPC .......................................... H02J 7/34
USPC ......................................... 320/126
See application file for complete search history.

(56) References Cited

U.S. PATENT DOCUMENTS 8,933,667 B2 * 1/2015 Park .................... H01M 10/441
                                                      320/117
2008/0007224 A1 * 1/2008 Melichar ............ G01R 31/3624
                                                      320/132

FOREIGN PATENT DOCUMENTS

JP    2002-095173 A    3/2002
JP    2005-176461 A    6/2005

* cited by examiner

*Primary Examiner* — Edward Tso
*Assistant Examiner* — Ahmed Omar
(74) *Attorney, Agent, or Firm* — Hazuki International, LLC

(57) ABSTRACT

A power supply apparatus includes a plurality of power storage modules that are connected in parallel and a backup power storage module that is connected in parallel with the plurality of power storage modules. When charging or discharging of at least one of the power storage modules is disabled, charging of the other power storage modules is inhibited, discharging of the backup power storage module is permitted, states of charge of the backup power storage module and the other power storage modules are detected, and charging of the backup power storage module and the other power storage modules is permitted in accordance with the detected states of charge.

13 Claims, 8 Drawing Sheets

POWER SUPPLY APPARATUS AND POWER SUPPLY SWITCHING METHOD

BACKGROUND

The present disclosure relates to a power supply apparatus using a battery and a power supply switching method.

In recent years, secondary batteries, such as lithium-ion batteries, have rapidly found extensive application in power storage apparatuses for storing electric power, storage batteries for vehicles, and the like which are combined with new energy systems, such as solar batteries and wind power systems. In order to generate high output power, when many power storage elements, for example, unit batteries (also called battery cells, electric cells, or cells) are used, a configuration is employed in which a plurality of power storage modules are connected in series. A battery block is configured such that a plurality of battery cells, for example, four battery cells, are connected in parallel and/or in series. A power storage module (also called an assembled battery) is configured such that many battery blocks are housed in an exterior case.

There is a power storage system in which a plurality of power storage modules are connected and a control device common to the plurality of power storage modules is provided. A configuration is provided in which each power storage module has a module controller and communication is performed between the module controller and the control device via a communication device.

When the power storage system is used as a power supply, in some cases, a power storage module has to be switched to a backup power storage module even during flow of current. Because it is difficult to turn off, for example, an emergency power supply or a power supply of a base station for mobile phones, switching between the power storage modules is performed during flow of current. However, when batteries that are different in terms of the amount of charge are connected with each other, a large current exceeding a rating flows from a battery having a large amount of charge into a battery having a small amount of charge, and such a current may damage a power storage module.

In terms of switching a power supply to a backup power supply, techniques disclosed in Japanese Unexamined Patent Application Publications Nos. 2002-095173 and 2005-176461 have been suggested in the related art. In the technique disclosed in Japanese Unexamined Patent Application Publication No. 2002-095173, the outputs of two batteries are each connected to a common power supply circuit via a field-effect transistor. When a battery is accidentally disconnected in a state in which power is supplied from the battery to a load, the state is switched to a state in which power is supplied from the other battery to the load.

In the technique disclosed in Japanese Unexamined Patent Application Publication No. 2005-176461, when power supply trouble occurs in a load device operated by direct-current power, direct-current backup power is supplied. There are provided battery packs that each include a plurality of secondary batteries connected in series so that a voltage necessary for the load device is obtained. The life of each battery pack is determined and, when it is determined that a battery pack reaches the end of its life, only that battery pack is taken off and replaced.

SUMMARY

In the technique disclosed in Japanese Unexamined Patent Application Publication No. 2002-095173, in the case where connection is performed, when a battery is disconnected, a backup operation is immediately performed by the other battery that is operating. The battery that has been operating is used. It is difficult for such a technique disclosed in Japanese Unexamined Patent Application Publication No. 2002-095173 to solve a drawback that occurs in the case where a non-operating power storage module is newly connected to an operating power storage module. In the technique disclosed in Japanese Unexamined Patent Application Publication No. 2005-176461, a direct current to direct current (DC-DC) converter provided on the output side of each battery pack is used so as to adjust a voltage. The same number of DC-DC converters as battery packs is necessary and a circuit configuration is large in scale, thereby resulting in a disadvantage in terms of cost.

Thus, in the present disclosure, it is desirable to provide a power supply apparatus and a power supply switching method which prevent an excessive current from flowing when a non-operating backup power storage module is connected to a power storage module during flow of current.

According to an embodiment of the present disclosure, there is provided a power supply apparatus. The power supply apparatus includes a plurality of power storage modules that are connected in parallel and a backup power storage module that is connected in parallel with the plurality of power storage modules. When charging or discharging of at least one of the power storage modules is disabled, charging of the other power storage modules is inhibited, discharging of the backup power storage module is permitted, states of charge of the backup power storage module and the other power storage modules are detected, and charging of the backup power storage module and the other power storage modules is permitted in accordance with the detected states of charge.

According to the embodiment of the present disclosure, there is provided a power supply switching method. The power supply switching method includes separating, from a system, at least one of a plurality of power storage modules that are connected in parallel, adding a backup power storage module such that the backup power storage module is connected in parallel with the other power storage modules, inhibiting charging of the other power storage modules and the backup power storage module when adding the backup power storage module, detecting respective states of charge of the other power storage modules and the backup power storage module, and permitting charging of the other power storage modules and the backup power storage module in accordance with the detected states of charge.

In the present disclosure, a power storage module may be switched to a backup power storage module during flow of current. In the case where these power storage modules are significantly different in terms of the state of charge, charging is inhibited when switching is performed. Thus, a large current that exceeds a rating may be prevented from flowing into a power storage module and damaging a system.

DETAILED DESCRIPTION OF EMBODIMENT

An embodiment described below is a desirable specific example of the present disclosure and various limitations which are technically desirable are imposed on the embodiment. However, the scope of the present disclosure is not limited to the embodiment unless a specific description limiting the present disclosure is given in the following description.

The following description will be made in the following order.
1. Embodiment
2. Applications
3. Modifications
1. Embodiment
Power Storage Module In order to generate high output power, when many power storage elements, for example, battery cells are used, a configuration is employed in which a plurality of power storage units (hereinafter referred to as power storage modules) are connected, for example, in series and a control device (hereinafter, appropriately referred to as a controller) that commonly controls the plurality of power storage modules is provided. The controller performs charging management, discharging management, and management for suppression of degradation and so forth. Such a configuration is referred to as a power storage system. The controller is constituted by a microcomputer.

As an example, the power storage module is configured such that many battery cells are housed in an exterior case made of metal. A positive terminal and a negative terminal which are used for connection project from the exterior case. In addition, a connector for communication is provided in the exterior case. The power storage system is configured such that a plurality of power storage modules each having such a configuration are connected. For example, the plurality of power storage modules are arranged in a rack. For example, each power storage module has 16 battery blocks and outputs 51.2 V (16×3.2 V).

Figure 1:
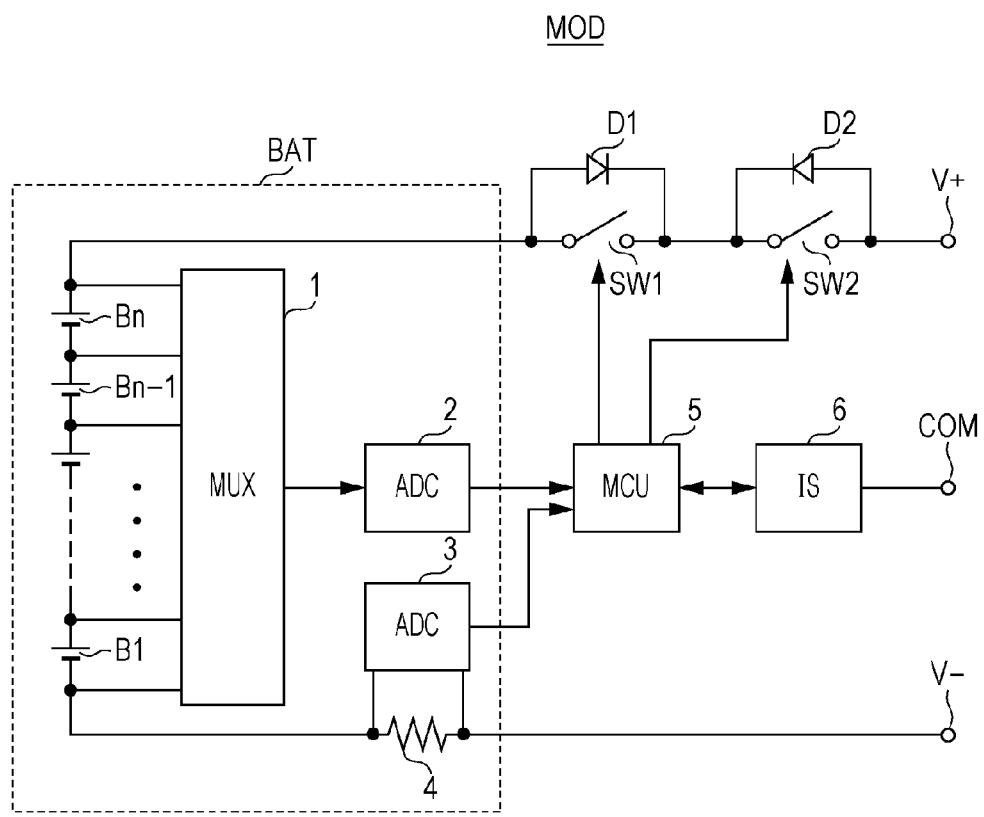
FIG. 1 is a block diagram of a power storage module according to an embodiment of the present disclosure.

FIG. 1 illustrates a schematic configuration of a power storage module MOD. The power storage module MOD is a unit in which a plurality of battery blocks are combined with a controller. As illustrated in FIG. 1, a voltage across n battery blocks B1 to Bn that are connected in series and the voltage of each battery block are supplied to a multiplexer 1. Although the battery blocks B1 to Bn are each illustrated as a single battery, the battery blocks B1 to Bn are each a battery group in which, for example, a plurality of lithium-ion secondary batteries are connected in parallel. The multiplexer 1 sequentially outputs the voltage across the battery blocks B1 to Bn and the voltage of each battery block. Battery cells may be used in place of the battery blocks B1 to Bn.

The multiplexer 1 switches between channels in accordance with, for example, a certain control signal and selects one piece of analog voltage data among n pieces of analog voltage data. The one piece of analog voltage data selected by the multiplexer 1 is supplied to an analog-to-digital (A/D) converter (indicated as ADC in FIG. 1) 2.

The A/D converter 2 converts the analog voltage data supplied from the multiplexer 1 into digital voltage data. For example, the analog voltage data is converted into 14- to 18-bit digital voltage data. A detection resistor 4 is connected so as to detect a discharge current and a voltage between both ends of the detection resistor 4 is supplied to an A/D converter 3. The A/D converter 3 converts the voltage between both ends of the detection resistor 4 into 14- to 18-bit digital current data. As techniques of the A/D converters 2 and 3, various techniques, such as a successive approximation technique and a delta sigma ($\Delta\Sigma$) technique, may be used. As illustrated surrounded by a dashed line, the battery blocks B1 to Bn, the multiplexer 1, and the A/D converters 2 and 3 are collectively referred to as a battery unit BAT.

The digital outputs of the A/D converters 2 and 3 are supplied to a micro controller unit (MCU) 5 via a serial interface. When necessary, the outputs of the two A/D converters 2 and 3 are multiplexed by a multiplexer. The MCU 5 has functions as a control unit and a communication unit. Individual circuit blocks may have these functions, respectively.

A switching element SW1 for charging and a switching element SW2 for discharging are inserted in series into a line extending from a positive electrode side of the battery blocks B1 to Bn to an output terminal V+. A diode D1 whose forward direction is a discharging direction is connected in parallel with the switching element SW1 and a diode D2 whose forward direction is a charging direction is connected in parallel with the switching element SW2. A charging current flows to the battery unit BAT through the diode D2 and the switching element SW1 which is in an on state, and a discharge current flows from the battery unit BAT through the diode D1 and the switching element SW2 which is in an on state.

On and off states of the switching elements SW1 and SW2 are controlled in accordance with a control signal output from the MCU 5. As the switching elements SW1 and SW2, a metal-oxide-semiconductor field-effect transistor (MOSFET) or an insulated gate bipolar transistor (IGBT) is typically used.

The communication unit of the MCU 5 is connected to an isolating unit 6 via a serial interface. A terminal of the isolating unit 6 is connected to a communication terminal COM. A controller that controls an entire power storage system is connected to the communication terminal COM. Isolated communication between the MCU 5 and the controller is interactive communication. The isolating unit 6 has a function of isolating the power storage module MOD and the controller from each other and functions as a transmission medium for interactive communication. The isolating unit 6 may have a function of supplying a power supply voltage to the MCU 5. As an interactive communication scheme performed through the isolating unit 6, for example, the controller area network (CAN) standard may be used. When electric power transmission is performed through the isolating unit 6, an electromagnetic induction scheme, a magnetic field resonance scheme, a radio wave receiving scheme, or the like may be used.

Power Storage System

Figure 2:
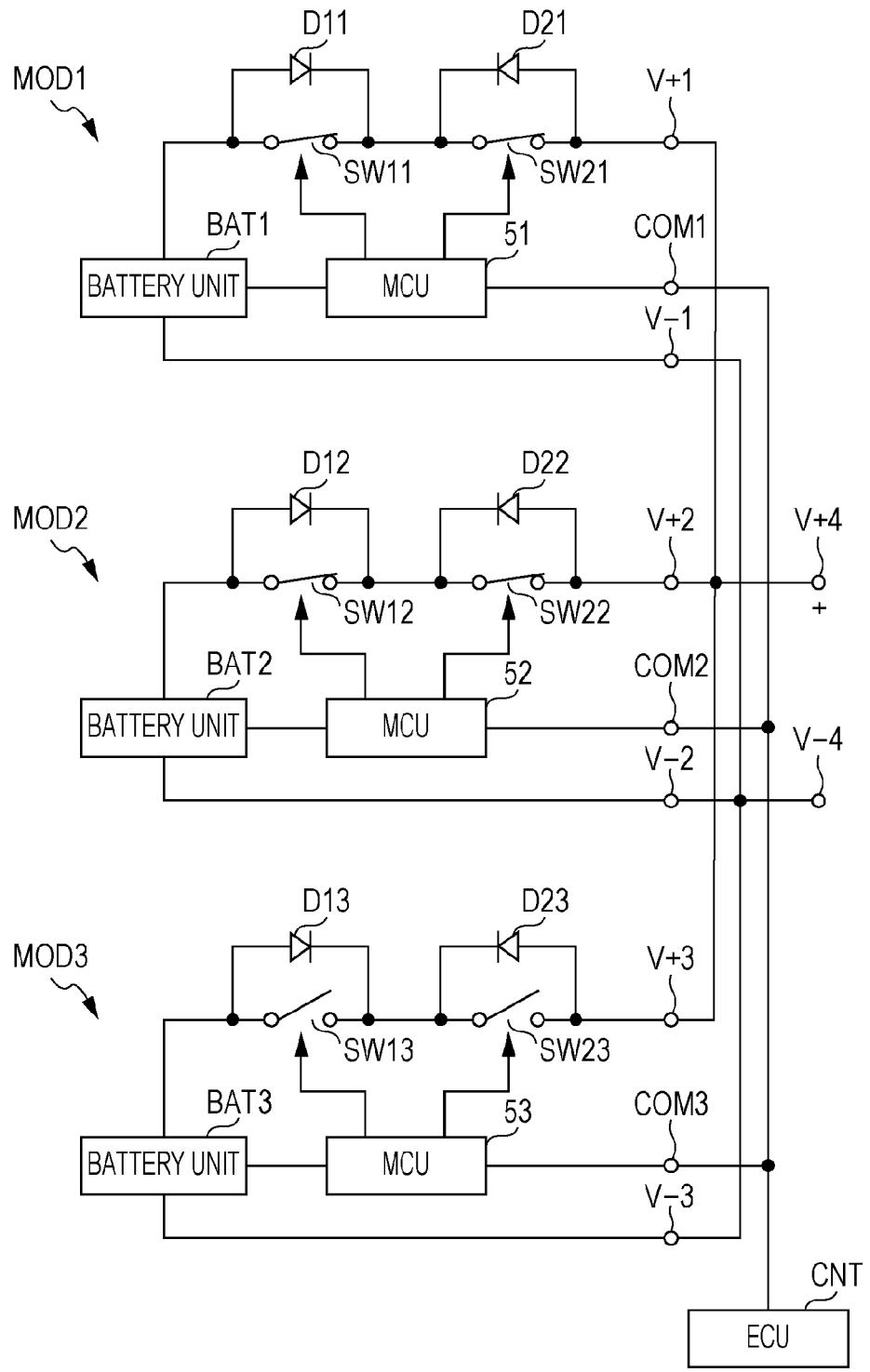
FIG. 2 is a block diagram of a power storage system according to the embodiment of the present disclosure in which three power storage modules are used.

As illustrated in FIG. 2, the power storage system is constituted by power storage modules MOD1, MOD2, and MOD3 which each serve as the above-described power storage module MOD. The power storage module MOD1 has a battery unit BAT1, switching elements SW11 and SW21, and an MCU 51. The MCU 51 receives voltage data and current data from the battery unit BAT1. A diode D11 is connected in parallel with the switching element SW11 and a diode D21 is connected in parallel with the switching element SW21.

The power storage module MOD2 has a battery unit BAT2, switching elements SW12 and SW22, and an MCU 52. A diode D12 is connected in parallel with the switching element SW12 and a diode D22 is connected in parallel with the switching element SW22. The MCU 52 receives voltage data and current data from the battery unit BAT2. The power storage module MOD3 has a battery unit BAT3, switching elements SW13 and SW23, and an MCU 53. A diode D13 is connected in parallel with the switching element SW13 and a diode D23 is connected in parallel with the switching element SW23. The MCU 53 receives voltage data and current data from the battery unit BAT3.

The power storage modules MOD1, MOD2, and MOD3 are connected in parallel. That is, positive-side output terminals V+1, V+2, and V+3 of these power storage modules are connected together and negative-side output terminals V−1, V−2, and V−3 of these power storage modules are connected together. Output terminals V+4 and V−4 are connected to the respective common connection points of the above connections. Communication terminals COM1, COM2, and COM3 of the power storage modules MOD1, MOD2, and MOD3 are connected to a communication terminal of a controller (indicated as ECU in FIG. 2) CNT via a bus. As the bus, such a serial interface as described above may be used.

Communication is performed between the controller CNT and each MCU of the power storage modules MOD1, MOD2, and MOD3. That is, the controller CNT receives information on an internal state of each power storage module, that is, battery information, and a charging process and a discharging process of each power storage module are managed. Specifically, the voltage data and the current data of the battery units BAT1, BAT2, and BAT3 are transmitted to the controller CNT. The controller CNT transmits a control signal for controlling each switching element to each MCU.

In the embodiment, as illustrated in FIG. 2, the switching elements SW11 and SW21 of the power storage module MOD1 are in an on state and the switching elements SW12 and SW22 of the power storage module MOD2 are in an on state. The switching elements SW13 and SW23 of the power storage module MOD3 are in an off state. That is, the two power storage modules MOD1 and MOD2 among the three power storage modules are operating, and the output generated by the two power storage modules connected in parallel is taken at the output terminals V+4 and V−4 and supplied to a load. The one power storage module MOD3 serves as a backup and is in a non-operating state.

Process of Switching between Power Storage Modules

Figure 6:
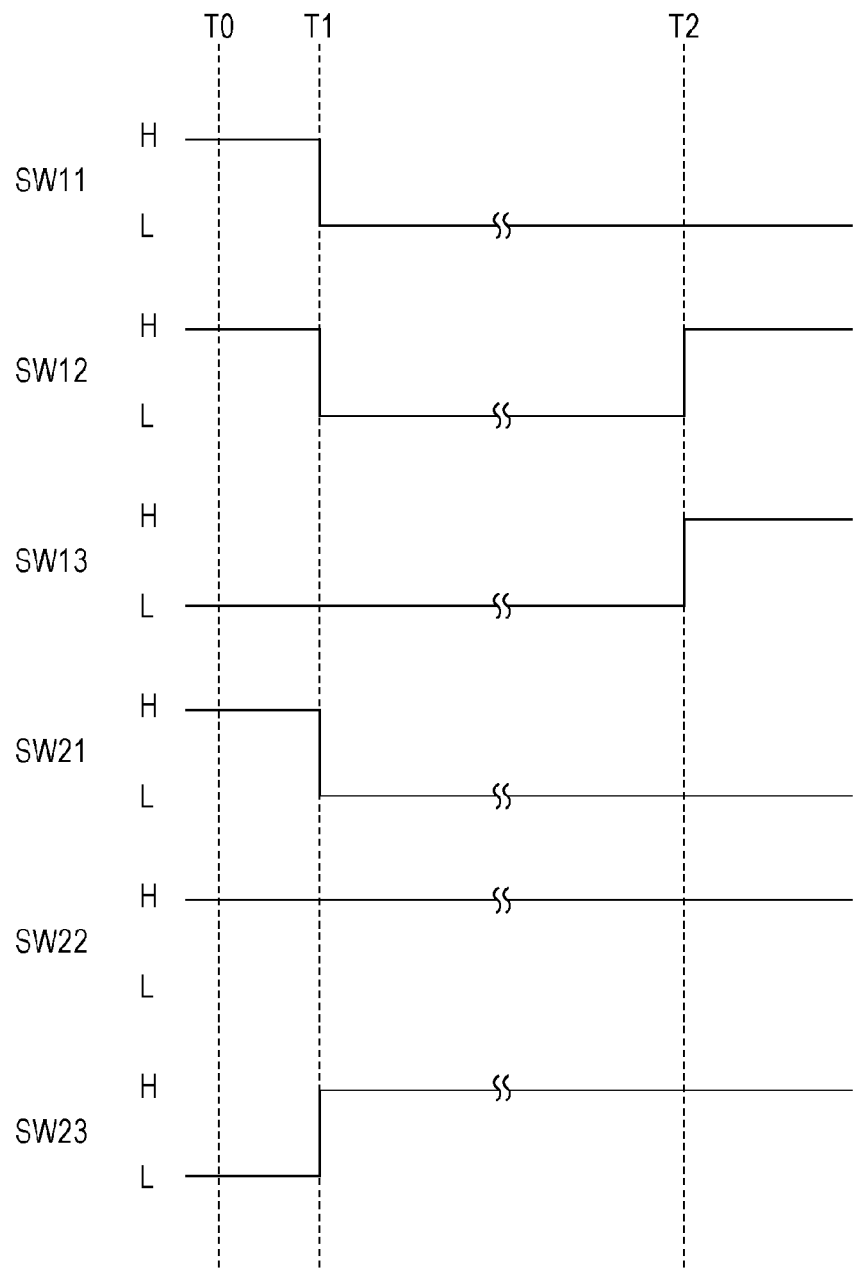
FIG. 6 is a timing chart used to illustrate the operation performed in the embodiment of the present disclosure.

A switching process will be described with reference to FIGS. 3, 4, 5, and 6, in which switching is performed so that, from the state illustrated in FIG. 2, the power storage modules MOD2 and MOD3 are put into an operating state and the power storage module MOD1 is put into a non-operating state. In FIG. 6, a high level H denotes that a switching element is in an on state and a low level L denotes that a switching element is in an off state. For example, at a timing T0 in FIG. 6, the following switching elements are in the following states.

Switching element SW11: on, switching element SW21: on

Switching element SW12: on, switching element SW22: on

Switching element SW13: off, switching element SW23: off

A switching process starts from a timing T1. At the timing T1, processes of steps S1, S2, and S3 are performed.

Figure 3:
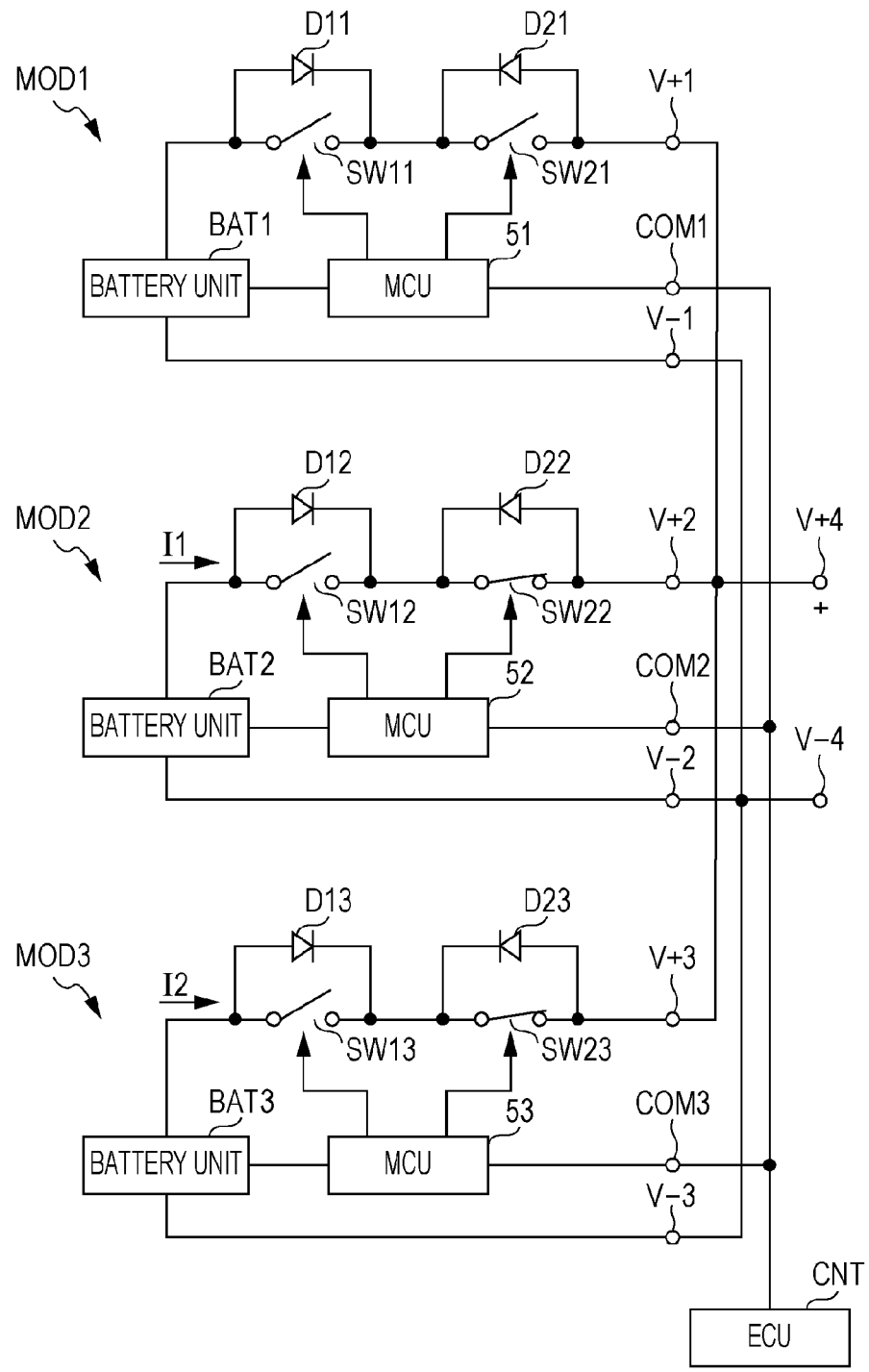
FIG. 3 is a block diagram used to illustrate an operation performed in the embodiment of the present disclosure.

Step S1: as illustrated in FIGS. 3 and 6, the switching elements SW11 and SW21 are turned off in accordance with a control signal from the MCU 51, and charging and discharging of the battery unit BAT1 of the power storage module MOD1 are inhibited. This separates the power storage module MOD1 from the power storage system.

Step S2: as illustrated in FIGS. 3 and 6, the switching element SW12 is turned off in accordance with a control signal from the MCU 52. The switching element SW22 remains on. Thus, charging of the battery unit BAT2 of the power storage module MOD2 is inhibited and discharging of the battery unit BAT2 of the power storage module MOD2 is not inhibited.

Step S3: as illustrated in FIGS. 3 and 6, in accordance with a control signal from the MCU 53, the switching element SW13 remains off and the switching element SW23 is turned on. Thus, charging of the battery unit BAT3 of the power storage module MOD3 is inhibited and only discharging of the battery unit BAT3 of the power storage module MOD3 is permitted.

Step S4: thus, discharging of the battery unit BAT2 of the power storage module MOD2 and the battery unit BAT3 of the power storage module MOD3 is performed. A discharge current I1 of the battery unit BAT2 is supplied to the controller CNT via the MCU 52 and a discharge current I2 of the battery unit BAT3 is supplied to the controller CNT via the MCU 53. The controller CNT determines whether or not these discharge currents I1 and I2 are substantially equal and transmits a determination result to the MCU 52 and the MCU 53. The fact that the discharge currents I1 and I2 are substantially equal means that it is determined that they are equal even if there is a difference of up to, for example, ±20%.

Figure 4:
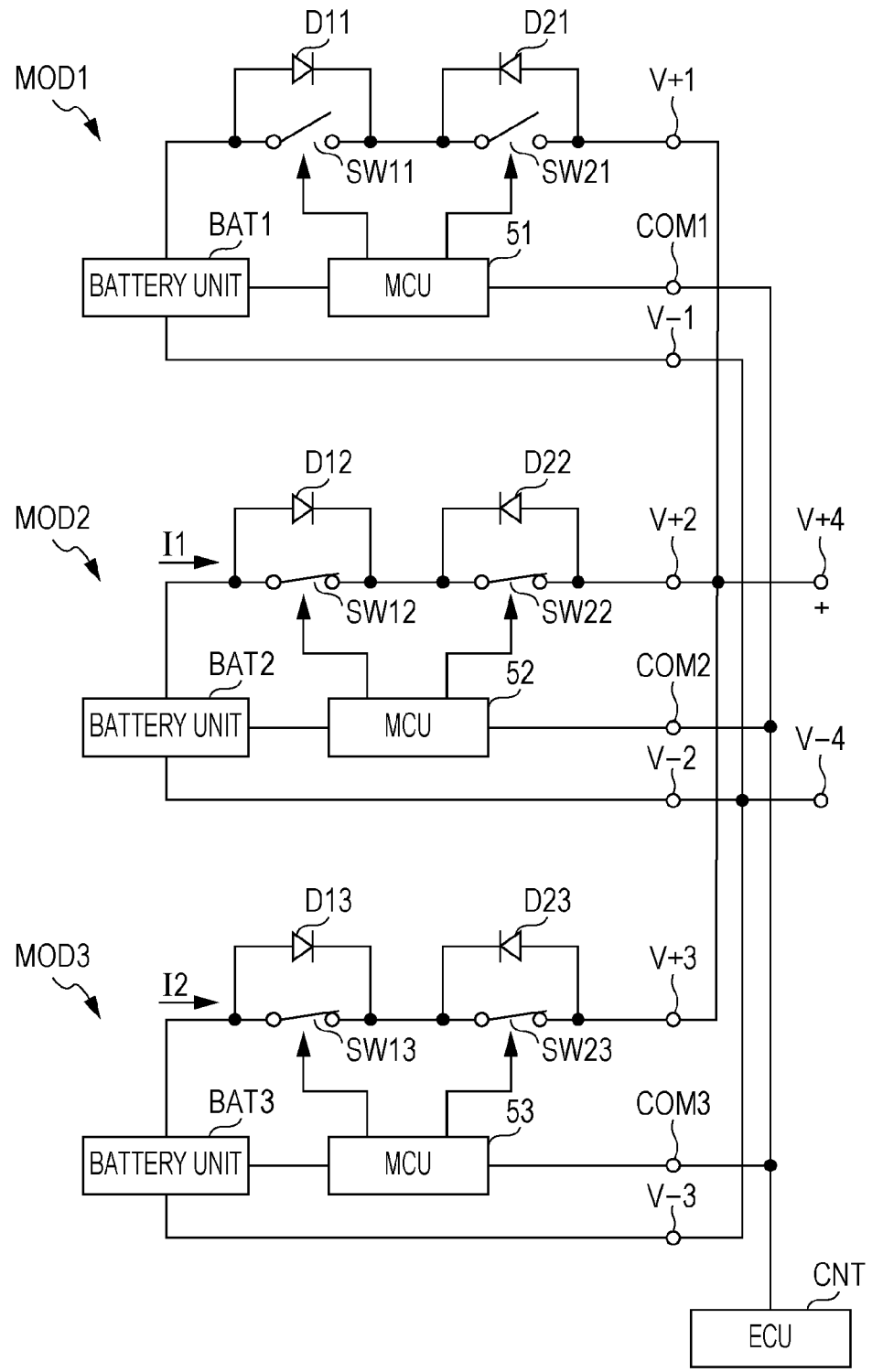
FIG. 4 is a block diagram used to illustrate the operation performed in the embodiment of the present disclosure.
Figure 5:
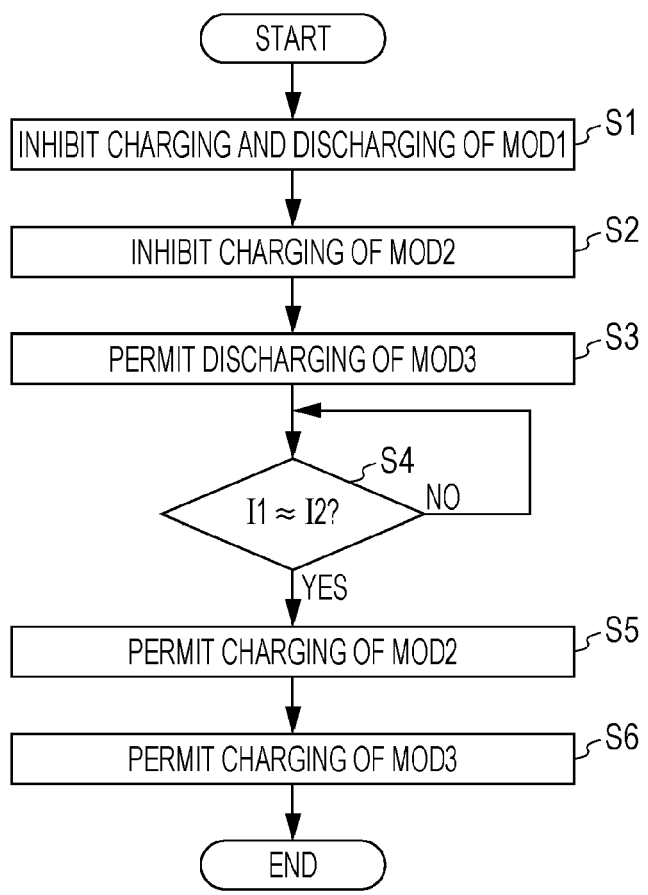
FIG. 5 is a flowchart used to illustrate the operation performed in the embodiment of the present disclosure.

Step S5: when it is determined that the discharge currents I1 and I2 are substantially equal in step S4 (at a timing T2 in FIG. 6), as illustrated in FIGS. 4 and 6, the switching element SW12 is turned on in accordance with a control signal of the MCU 52 and charging is permitted.

Step S6: when it is determined that the discharge currents I1 and I2 are substantially equal in step S4 (at the timing T2 in FIG. 6), as illustrated in FIGS. 4 and 6, the switching element SW13 is turned on in accordance with a control signal of the MCU 53 and charging is permitted.

According to the switching process described above, as illustrated in FIG. 4, the power storage module MOD1 is separated from the power storage system and the power storage module MOD3 is connected to the power storage system. In the embodiment of the present disclosure, in a first stage, as illustrated in FIG. 3, separation of the operating power storage module MOD1 is performed and also connection of the non-operating power storage module MOD3 is performed. Thus, supply of power to the load is not interrupted.

Then, charging of the power storage modules MOD2 and MOD3 is inhibited until the discharge currents I1 and I2 become substantially equal. Hence, a large charging current may be prevented from flowing from one of the power storage modules, e.g., the power storage module MOD3 into the other, e.g., the power storage module MOD2, even when these power storage modules are different in terms of the amount of charge, so that damage to a circuit element and a battery may be prevented.

2. Applications

Power Storage System in Housing as Application

Figure 7:
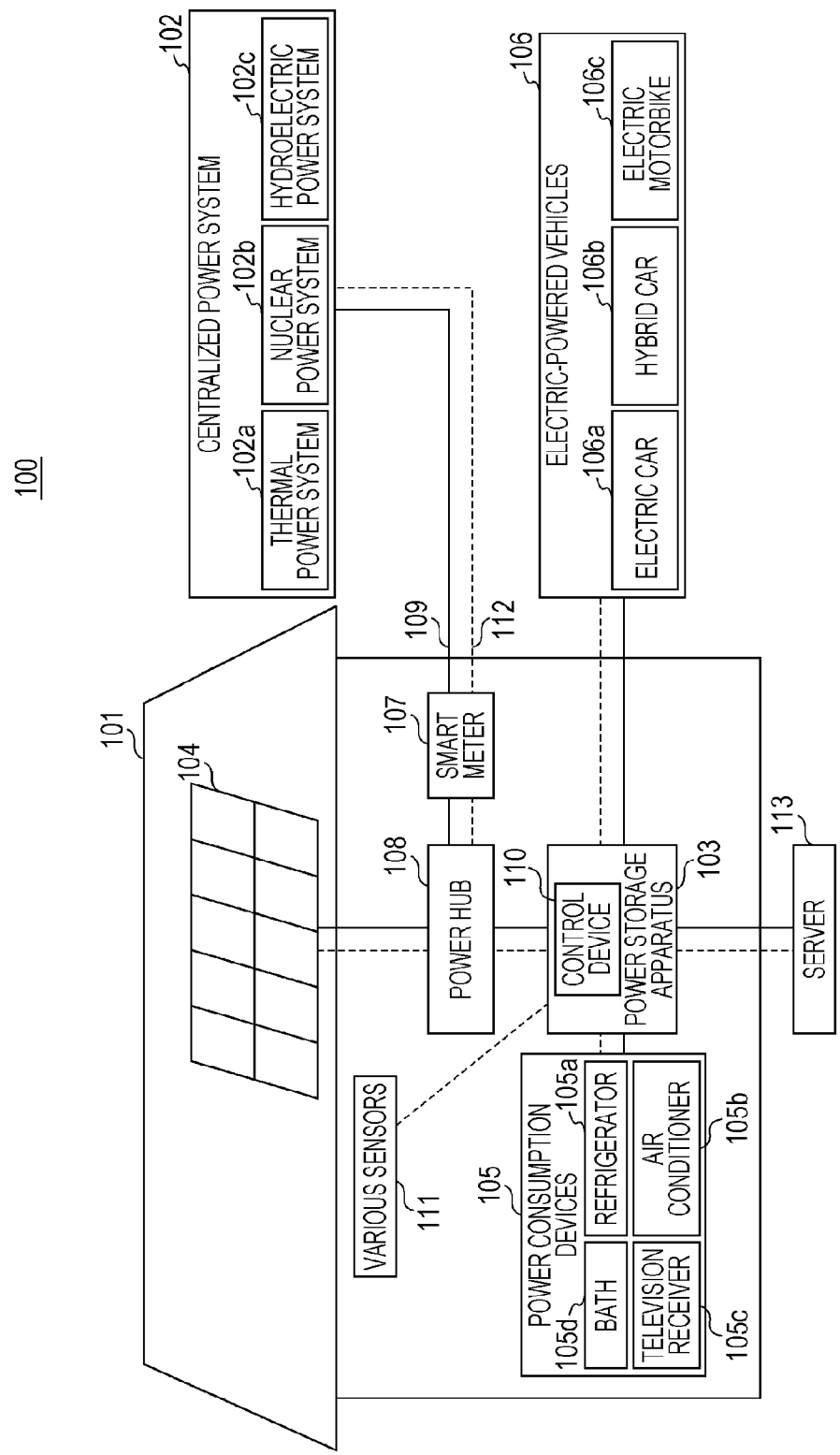
FIG. 7 is a block diagram illustrating a first application of the power storage system according to the embodiment of the present disclosure.

An example where the present disclosure is applied to a power storage system for houses will be described with reference to FIG. 7. For example, in a power storage system 100 for a house 101, electric power is supplied from a centralized power system 102, such as a thermal power system 102a, a nuclear power system 102b, or a hydroelectric power system 102c, to a power storage apparatus 103 via an electric power network 109, an information network 112, a smart meter 107, a power hub 108, and so forth. Along with this, electric power is supplied from an independent power supply, such as a domestic power generation apparatus 104, to the power storage apparatus 103. The electric power supplied to the power storage apparatus 103 is stored. Electric power to be used in the house 101 is supplied by using the power storage apparatus 103. A similar power storage system may be used for a building instead of the house 101.

In the house 101, there are provided the power generation apparatus 104, power consumption devices 105, the power storage apparatus 103, a control device 110 that controls the apparatuses and the devices, the smart meter 107, and sensors 111 that obtain various types of information. The apparatuses and the devices are connected to one another with the electric power network 109 and the information network 112. As the power generation apparatus 104, a solar battery, a fuel battery, or the like is used, and generated electric power is supplied to the power consumption devices 105 and/or the power storage apparatus 103. Examples of the power consumption devices 105 include a refrigerator 105a, an air conditioner 105b, a television receiver 105c, and a bath 105d. In addition, the examples of the power consumption devices 105 include electric-powered vehicles 106. The electric-powered vehicles 106 are an electric car 106a, a hybrid car 106b, and an electric motorbike 106c.

The power supply apparatus according to the embodiment of the present disclosure is applied to the power storage apparatus 103. The power storage apparatus 103 is constituted by a secondary battery or a capacitor. The power storage apparatus 103 is constituted by, for example, a lithium-ion battery. The lithium-ion battery may be a stationary battery or a battery used in the electric-powered vehicles 106. The smart meter 107 has functions of measuring the amount of commercial power used and transmitting the measured amount to an electric power company. The electric power network 109 may be used for any one of or a combination of two or more of direct-current (DC) power supply, alternating-current (AC) power supply, and contactless power supply.

Examples of the various sensors 111 include a human detection sensor, an illuminance sensor, an object detection sensor, a power consumption sensor, a vibration sensor, a contact sensor, a temperature sensor, and an infrared sensor. The information obtained by the various sensors 111 is transmitted to the control device 110. The weather conditions, the condition of a person, and the like are grasped by using the information from the sensors 111, and the power consumption devices 105 are automatically controlled, so that energy consumption may be minimized. In addition, the control device 110 may transmit information on the house 101 to an external electric power company and so forth via the Internet.

Processes, such as branching of a power line and DC/AC conversion, are performed by using the power hub 108. Examples of a communication scheme of the information network 112 connected to the control device 110 include a scheme in which a communication interface, such as a universal asynchronous receiver-transceiver (UART), is used, and a scheme in which a sensor network based on a wireless communication standard, such as Bluetooth (registered trademark), ZigBee, or Wi-Fi, is used. The Bluetooth scheme is applied to multimedia communication and allows one-to-many connection communication. In ZigBee, the physical layer of the Institute of Electrical and Electronics Engineers (IEEE) 802.15.4 is used. IEEE 802.15.4 is the name of a short-range wireless network standard called a personal area network (PAN) or wireless (W) PAN.

The control device 110 is connected to an external server 113. The server 113 may be managed by any of the house 101, an electric power company, and a service provider. Examples of information transmitted and received by the server 113 include power consumption information, life pattern information, electric power charges, weather information, natural disaster information, and information on electricity transactions. These pieces of information may be transmitted and received from a power consumption device in the home (for example, a television receiver), or alternatively may be transmitted and received from a device outside the home (for example, a mobile phone). These pieces of information may be displayed on a device having a display function, for example, a television receiver, a mobile phone, or a personal digital assistant (PDA).

The control device 110 that controls each unit is constituted by a central processing unit (CPU), a random access memory (RAM), a read only memory (ROM), and so forth. In this example, the control device 110 is housed in the power storage apparatus 103. The control device 110 is connected to the power storage apparatus 103, the domestic power generation apparatus 104, the power consumption devices 105, the various sensors 111, and the server 113 with the information network 112, and has a function of, for example, adjusting the amount of commercial power used and the amount of power generation. In addition, the control device 110 may have a function allowing electricity transactions to be carried out in an electricity market, or the like.

As described above, not only electric power supplied from the centralized power system 102, such as the thermal power system 102a, the nuclear power system 102b, or the hydroelectric power system 102c, but also electric power generated by the domestic power generation apparatus 104 (solar power generation or wind power generation) may be stored in the power storage apparatus 103. Thus, even when the electric power generated by the domestic power generation apparatus 104 varies, control may be performed in which the amount of electric power to be transmitted outside is kept constant or electric power is discharged by only the amount necessary. For example, electric power obtained by solar power generation is stored in the power storage apparatus 103, nighttime electric power whose rates are low during the nighttime is also stored in the power storage apparatus 103, and the electric power that has been stored by the power storage apparatus 103 is discharged and used in a time zone in which the rates are high during the daytime.

In this example, an example where the control device 110 is housed in the power storage apparatus 103 is described; alternatively, the control device 110 may be housed in the smart meter 107 or may be provided separately. Furthermore, the power storage system 100 may be used for a plurality of households in an apartment house or may be used for a plurality of detached houses.

Power Storage System in Vehicle as Application

Figure 8:
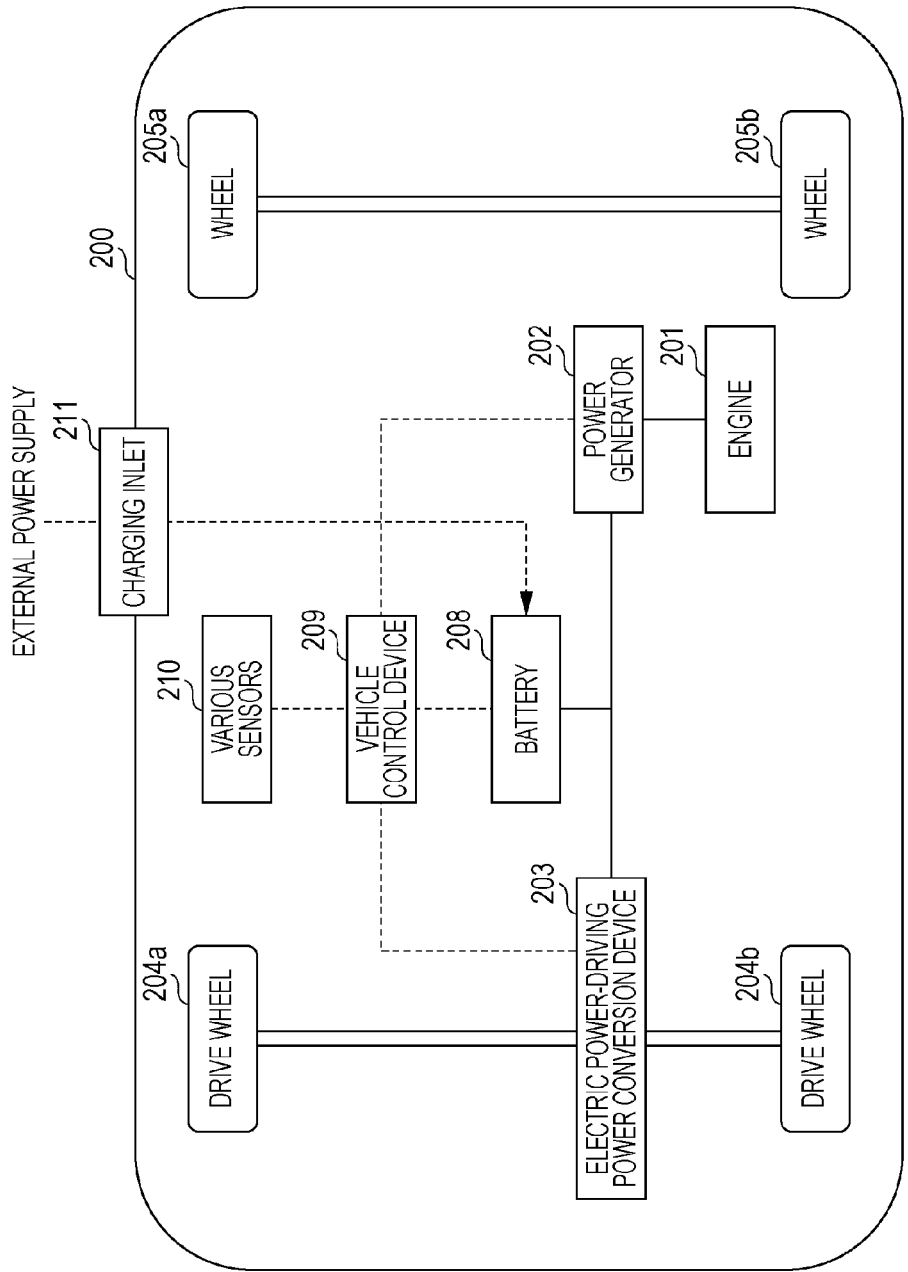
FIG. 8 is a block diagram illustrating a second application of the power storage system according to the embodiment of the present disclosure.

An example where the present disclosure is applied to a power storage system for vehicles will be described with reference to FIG. 8. FIG. 8 schematically illustrates an example of the configuration of a hybrid vehicle employing a series hybrid system to which the present disclosure is applied. The series hybrid system is a car that runs with an electric power-driving power conversion device by using electric power generated by a power generator driven by an engine or by using the electric power that has been temporarily stored in a battery.

On a hybrid vehicle 200, there are mounted an engine 201, a power generator 202, an electric power-driving power conversion device 203, a drive wheel 204a, a drive wheel 204b, a wheel 205a, a wheel 205b, a battery 208, a vehicle control device 209, various sensors 210, and a charging inlet 211. The power supply apparatus according to the embodiment of the present disclosure is applied to the battery 208.

The hybrid vehicle 200 runs with the electric power-driving power conversion device 203 as a power source. An example of the electric power-driving power conversion device 203 is a motor. The electric power-driving power conversion device 203 is activated by the electric power of the battery 208 and the rotational force of the electric power-driving power conversion device 203 is transferred to the drive wheels 204a and 204b. DC-AC conversion or reverse conversion (AC-DC conversion) is used at a necessary place and the electric power-driving power conversion device 203 is thereby applicable to either an AC motor or a DC motor. The various sensors 210 control engine speed or the opening degree (throttle opening degree) of a throttle valve, which is not illustrated, via the vehicle control device 209. Examples of the various sensors 210 include a speed sensor, an acceleration sensor, and an engine speed sensor.

The rotational force of the engine 201 is transferred to the power generator 202 and electric power generated by the power generator 202 by using the rotational force may be stored in the battery 208.

When the hybrid vehicle 200 is decelerated by a brake mechanism, which is not illustrated, the resistance force during deceleration is added, as rotational force, to the electric power-driving power conversion device 203. Then, the regenerative electric power generated by the electric power-driving power conversion device 203 by using the rotational force is stored in the battery 208.

The battery 208 is connected to an external power supply outside the hybrid vehicle 200, receives electric power from the external power supply via the charging inlet 211 serving as an input port, and may store the received electric power.

Although not illustrated in FIG. 8, an information processing device that performs information processing concerning vehicle control on the basis of information on a secondary battery may be provided. Such an information processing device is, for example, an information processing device that displays the remaining capacity of a battery on the basis of information on the remaining capacity of the battery.

In the above description, a series hybrid vehicle is taken as an example that runs with a motor by using electric power generated by a power generator driven by an engine or by using the electric power that has been temporarily stored in a battery. However, the present disclosure is effectively applicable to a parallel hybrid vehicle in which the output of either an engine or a motor is used as a driving source and switching between three modes of running using only the engine, running using only the motor, and running using the engine and the motor is appropriately performed. In addition, the present disclosure is effectively applicable to a so-called electric-powered vehicle that runs with the driving power of only a drive motor without using an engine.

The present disclosure may have the following configurations.

(1) A power supply apparatus including: a plurality of power storage modules that are connected in parallel; and a backup power storage module that is connected in parallel with the plurality of power storage modules, wherein, when charging or discharging of at least one of the power storage modules is disabled, charging of the other power storage modules is inhibited, and wherein discharging of the backup power storage module is permitted, states of charge of the backup power storage module and the other power storage modules are detected, and charging of the backup power storage module and the other power storage modules is permitted in accordance with the detected states of charge.

(2) The power supply apparatus according to item (1), wherein the states of charge of the backup power storage module and the other power storage modules are detected from respective discharge currents.

(3) The power supply apparatus according to item (2), wherein charging of the backup power storage module and the other power storage modules is permitted after the respective discharge currents become substantially equal.

(4) The power supply apparatus according to item (3), wherein the charging is permitted after a difference between the respective discharge currents becomes ±20%.

(5) The power supply apparatus according to item (1), wherein the states of charge of the backup power storage module and the other power storage modules are detected from respective output voltages.

(6) The power supply apparatus according to item (1), wherein the plurality of power storage modules each include a battery unit, a charging switch, a discharging switch, and a control unit that controls the charging switch and the discharging switch, wherein the backup power storage module includes a battery unit, a charging switch, a discharging switch, and a control unit that controls the charging switch and the discharging switch, wherein, when charging or discharging of at least one of the power storage modules is disabled, the charging switches of the other power storage modules and the backup power storage module are turned off, and wherein, after discharge currents of the other power storage modules and the backup power storage module become substantially equal, the charging switches of the backup power storage module and the other power storage modules are turned on.

(7) The power supply apparatus according to item (6), wherein the charging switches are turned on after a difference between the discharge currents of the other power storage modules and the backup power storage module becomes ±20%.

(8) The power supply apparatus according to item (6) or (7), further including: a controller that communicates with the control units of the plurality of power storage modules and the control unit of the backup power storage module, wherein the controller controls the charging switches and the discharging switches through the control units of the plurality of power storage modules and the control unit of the backup power storage module.

(9) The power supply apparatus according to any one of items (6), (7), and (8), wherein both the charging switch and the discharging switch of the backup power storage module are off under normal conditions.

(10) The power supply apparatus according to item (1), wherein the number of the plurality of power storage modules is N (N=2, 3, 4, . . . ), and wherein the number of the backup power storage modules is one.

(11) The power supply apparatus according to item (1), wherein the number of the plurality of power storage modules is N (N=2, 3, 4, . . . ), wherein the number of the backup power storage modules is two or more, and wherein one of the backup power storage modules is selectively used.

(12) A power supply switching method including: separating, from a system, at least one of a plurality of power storage modules that are connected in parallel; adding a backup power storage module such that the backup power storage module is connected in parallel with the other power storage modules; inhibiting charging of the other power storage modules and the backup power storage module when adding the backup power storage module; detecting respective states of charge of the other power storage modules and the backup power storage module; and permitting charging of the other power storage modules and the backup power storage module in accordance with the detected states of charge.

(13) The power supply switching method according to item (12), wherein the plurality of power storage modules each include a battery unit, a charging switch, a discharging switch, and a control unit that controls the charging switch and the discharging switch, wherein the backup power storage module includes a battery unit, a charging switch, a discharging switch, and a control unit that controls the charging switch and the discharging switch, and wherein the power supply switching method includes, with the control units, controlling permission or inhibition of charging by turning on or off the charging switches, with the control units, controlling permission or inhibition of discharging by turning on or off the discharging switches, when separating at least one of the power storage modules from the system, turning off the charging switches of the other power storage modules and the backup power storage module, and after discharge currents of the other power storage modules and the backup power storage module become substantially equal, turning on the charging switches of the backup power storage module and the other power storage modules.

3. Modifications

The embodiment of the present disclosure is specifically described above; however, the present disclosure is not limited to the foregoing embodiment and various modifications based on the technical idea of the present disclosure may be made. For example, the configurations, methods, processes, shapes, materials, numerical values, and so forth that are described in the foregoing embodiment are merely examples, and configurations, methods, processes, shapes, materials, numerical values, and so forth that are different from the above may be used when necessary.

The configurations, methods, processes, shapes, materials, numerical values, and so forth that are described in the foregoing embodiment may be combined with one another without departing from the gist of the present disclosure.

For example, the number of power storage modules is not limited to three as in the foregoing embodiment. Five power storage modules are used and two of the power storage modules may be used as backups. That is, when three power storage modules are operating, one of the three power storage modules is put into a non-operating state and separated from them, and one of the backup power storage modules is connected to them. In this case as well, after it is determined that the respective discharge currents of the two power storage modules that have been in an operating state from the beginning and the discharge current of the newly connected power storage module become substantially equal, charging of these power storage modules is permitted. Furthermore, in the foregoing embodiment, the fact that the discharge currents are substantially equal is detected; alternatively, the state of charge (SOC) of each power storage module may be detected from the output voltage of the power storage module.

The present disclosure contains subject matter related to that disclosed in Japanese Priority Patent Application JP 2012-125661 filed in the Japan Patent Office on Jun. 1, 2012, the entire contents of which are hereby incorporated by reference.

What is claimed is:

1. A power supply apparatus comprising:
a plurality of power storage modules that are connected in parallel; and
a backup power storage module that is connected in parallel with the plurality of power storage modules,
wherein, when charging or discharging of at least one of the power storage modules is disabled, charging of the other power storage modules is inhibited, and
wherein discharging of the backup power storage module is permitted, states of charge of the backup power storage module and the other power storage modules are detected, and charging of the backup power storage module and the other power storage modules is permitted in accordance with the detected states of charge.

2. The power supply apparatus according to claim 1, wherein the states of charge of the backup power storage module and the other power storage modules are detected from respective discharge currents.

3. The power supply apparatus according to claim 2, wherein charging of the backup power storage module and the other power storage modules is permitted after the respective discharge currents become substantially equal.

4. The power supply apparatus according to claim 3, wherein the charging is permitted after a difference between the respective discharge currents becomes ±20%.

5. The power supply apparatus according to claim 1, wherein the states of charge of the backup power storage module and the other power storage modules are detected from respective output voltages.

6. The power supply apparatus according to claim 1, wherein the plurality of power storage modules each include a battery unit, a charging switch, a discharging switch, and a control unit that controls the charging switch and the discharging switch,
wherein the backup power storage module includes a battery unit, a charging switch, a discharging switch, and a control unit that controls the charging switch and the discharging switch,
wherein, when charging or discharging of at least one of the power storage modules is disabled, the charging switches of the other power storage modules and the backup power storage module are turned off, and
wherein, after discharge currents of the other power storage modules and the backup power storage module become substantially equal, the charging switches of the backup power storage module and the other power storage modules are turned on.

7. The power supply apparatus according to claim 6, wherein the charging switches are turned on after a difference between the discharge currents of the other power storage modules and the backup power storage module becomes ±20%.

8. The power supply apparatus according to claim 6, further comprising:
a controller that communicates with the control units of the plurality of power storage modules and the control unit of the backup power storage module,
wherein the controller controls the charging switches and the discharging switches through the control units of the plurality of power storage modules and the control unit of the backup power storage module.

9. The power supply apparatus according to claim 6,
wherein both the charging switch and the discharging switch of the backup power storage module are off under normal conditions.

10. The power supply apparatus according to claim 1,
wherein the number of the plurality of power storage modules is N (N=2, 3, 4, . . . ), and
wherein the number of the backup power storage modules is one.

11. The power supply apparatus according to claim 1,
wherein the number of the plurality of power storage modules is N (N=2, 3, 4, . . . ),
wherein the number of the backup power storage modules is two or more, and
wherein one of the backup power storage modules is selectively used.

12. A power supply switching method comprising:
separating, from a system, at least one of a plurality of power storage modules that are connected in parallel;
adding a backup power storage module such that the backup power storage module is connected in parallel with the other power storage modules;
inhibiting charging of the other power storage modules and the backup power storage module when adding the backup power storage module;
detecting respective states of charge of the other power storage modules and the backup power storage module; and
permitting charging of the other power storage modules and the backup power storage module in accordance with the detected states of charge.

13. The power supply switching method according to claim 12,
wherein the plurality of power storage modules each include a battery unit, a charging switch, a discharging switch, and a control unit that controls the charging switch and the discharging switch,
wherein the backup power storage module includes a battery unit, a charging switch, a discharging switch, and a control unit that controls the charging switch and the discharging switch, and
wherein the power supply switching method includes,
with the control units, controlling permission or inhibition of charging by turning on or off the charging switches,
with the control units, controlling permission or inhibition of discharging by turning on or off the discharging switches,
when separating at least one of the power storage modules from the system, turning off the charging switches of the other power storage modules and the backup power storage module, and
after discharge currents of the other power storage modules and the backup power storage module become substantially equal, turning on the charging switches of the backup power storage module and the other power storage modules.

* * * * *